Sept. 1, 1931. E. A. NELSON Re. 18,176

BRAKE DRUM CONSTRUCTION

Original Filed April 16, 1928 2 Sheets-Sheet 1

INVENTOR
Emil A. Nelson.
BY
Harness, Dickey, Pierce & Hann
ATTORNEYS.

Sept. 1, 1931. E. A. NELSON Re. 18,176

BRAKE DRUM CONSTRUCTION

Original Filed April 16, 1928 2 Sheets-Sheet 2

INVENTOR
Emil A. Nelson.
BY
Harness, Dickey, Pierce & Hann
ATTORNEYS.

Reissued Sept. 1, 1931

Re. 18,176

UNITED STATES PATENT OFFICE

EMIL A. NELSON, OF DETROIT, MICHIGAN

BRAKE DRUM CONSTRUCTION

Original No. 1,750,682, dated March 18, 1930, Serial No. 270,179, filed April 16, 1928. Application for reissue filed September 23, 1930. Serial No. 483,961.

This invention relates to brake drums and particularly to a type suitable for use on motor vehicles, the principal object being the provision of a new and novel construction for the same.

Another object is to provide a brake drum construction that will be economical to produce and efficient in operation.

Another object is to provide a brake drum construction that will not be subject to distortion under braking pressure or because of heat.

Another object is to provide a brake drum construction in which the brake drum is of substantially identical section on either side of a plane passing centrally therethrough and perpendicular to its axis.

A further object is to provide a brake drum of ring-like form supported substantially midway between the side edges thereof.

The above being among the objects of the present invention, the same consists in certain features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views,—

Figure 1:
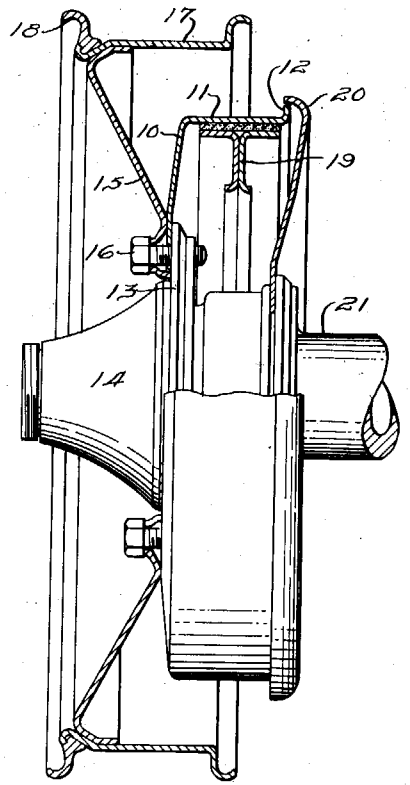
Fig. 1 is a partially broken edge view of a conventional wheel and brake drum construction.

In the conventional form of brake drum construction, as illustrated in Fig. 1, the brake drum comprises a disc-like supporting portion 10, a cylindrical brake shoe or brake band engaging portion 11 carried by the portion 10 and extending laterally in one direction therefrom, and a peripheral radial flanged portion 12 provided to impart strength to the outer edge of the portion 11. The drum may be secured to a wheel in various manners, the method shown being conventional and in which the disc portion 10 is secured against the flange 13 of the wheel hub 14 by being clamped between the same and the wheel disc 15 by means of the bolts 16. The wheel disc 15 carries the usual rim 17 and co-operating lock ring 18. A brake shoe 19 which may be of any conventional construction is adapted to engage the inner side of the portion 11 of the drum upon application of the brakes through suitable mechanism (not shown). A dust shield 20 carried by the axle housing 21 is conventionally employed to protect the interior of the brake drum from dust and other foreign matter. In this type of brake mechanism, which is conventional, when the brakes are applied so as to force the shoes 19 out into contact with the portion 11 of the drum, there is a tendency for the portion 11 to distort. This is due to the fact that the disc portion 10 of the drum is of such extreme stiffness that the adjacent edge of the portion 11, which will be called the inner edge of the portion 11, is prevented from radially expanding, while the opposite edge of the portion 11 which is reinforced against radial expansion only by the relatively small flange 12, is relatively weaker and consequently is expanded an amount sufficient to concentrate the pressure between the portions 11 and the brake shoes 19 at the inner edge of the portion 11 in the usual short application of the brake. This concentration of pressure causes an undue wear of both the drum and the friction lining of the shoes 19 at the inner edge of the portion 11 during ordinary brake applications, and as is well known to those skilled in the art, such concentration of pressure over a relatively limited area is conducive to squealing brakes and scored drums. The concentration of such pressure will, of course, vary with a particular severity of the brake application in any particular case, as will the deforming of the portion 11, so that it is practically impossible for the brake shoes to wear to a point where they will equally engage the drum for all brake applications of varying intensity. Furthermore, with the conventional construction, as illustrated, where there is a dragging of the brakes, a severe application of the brakes at high speed, or a continued application of the brakes such as in descending a mountain, so as to cause the brake drum to become heated, the portion 11 in becoming heated expands with the flange 12 to a relatively greater extent than the portion 10 with the result that the deformation of the portion 11 is increased. That is, the inner edge is held against expansion by the portion 10 and the outer edge in expanding to a greater diameter, causes the portion 11 to assume the shape of a frustum of a cone, and this deformation is in addition to the deformation caused by the expansive pressure of the brake elements previously described. The fact that the heat generated due to the braking action does not flow evenly both ways from the braking surface, but principally towards one side only thereof, further explains the unequal expansion of the drum. This deformation caused by heating of the portion 11 aggravates the deformation due solely to the pressure of the brake elements against it, as first described.

One of the methods of correcting these disadvantages has been the increasing of the dimensions of the flange 12, but inasmuch as this is usually limited by clearances necessary in such constructions and because of the difficulties experienced in drawing operations, the dimensions of the flange 12 are necessarily limited. The drums themselves have been increased in thickness as far as is practical, but due to the modern tendency of forming such drums from high carbon steel in order to avoid scoring and wear, the practical limits of thickness are relatively small due to the fact that with such steel, drawing of the metal becomes extremely difficult and hard to control. Forging of such drums is, of course, impractical in mass production because of the expense involved.

By the use of the present invention I provide a brake drum construction which will deform but little, if any, under temporary application of the brakes, and, if at all, uniformly, and when heated by continuous application of the brakes, will expand uniformly so as to present at all times a true cylindrical surface for contact with the brake elements.

Figure 2:
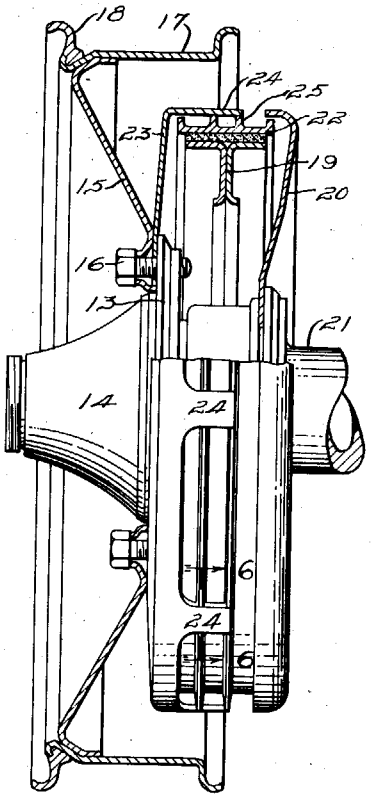
Fig. 2 is a view similar to Fig. 1 but illustrating one form of my improved brake drum construction in connection therewith.
Figure 6:
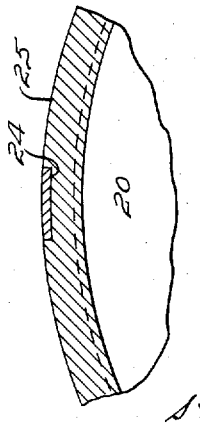
Fig. 6 is a fragmentary sectional view taken on the line 6—6 of Fig. 2.

One form of my improved brake construction is illustrated in Figs. 2 and 6. In these figures, the hub 14, wheel 15 and housing 21 are identical with the construction in Fig. 1. The brake drum, in this case, instead of being the conventional integral construction, as shown in Fig. 1, is made up of two major parts, a drum portion 22 and a supporting portion 23. The supporting portion 23 is similar to the portion 10 of the conventional brake drum and is secured to the hub 14 in the same manner, but instead of being provided with the cylindrical portion 11, it is provided with a plurality of separate spaced fingers 24 which extend laterally outwardly therefrom. The portion 22 which forms the brake drum proper is provided with a cylindrical inner surface and a plurality of radially extending circumferential ribs 25, the particular embodiment showing the provision of four of such ribs, the two center ones of which extend outwardly from the portion 22 to a slightly greater extent than the marginal ribs. The two center ribs 25 are recessed as at 26 in Fig. 6, in line with each one of the fingers 24 and such fingers are received within the recess 26 and are welded or otherwise suitably secured therein. Except at the points where the fingers 24 are secured to the two center ribs 25, the supporting portion 23 and fingers 24 are freely spaced from the brake drum 22. The brake drum 22, in this case, may be formed to the section shown by a hot rolling process and employing a relatively high carbon steel whereby the finished brake drum is of maximum hardness and strength, or it may be of cast construction. It will be apparent that with this construction, the radial pressure of the brake shoes 19 in their application to the drum 22, will cause equal radial expansion of the drum 22 throughout its width due to the fact that the section of the drum 22 is identical on either side of a plane passing through its center and perpendicular to its axis, and it will be further apparent that heat generated during a braking action will be distributed equally on both sides of the central plane of the drum and any expansion of the drum 22 due to heat will likewise be evenly distributed throughout the width of the drum 22. When any such deformation or expansion occurs, the fingers 24 will easily give a sufficient amount to permit such expansion without exerting an undue resistance to such expansion.

Figure 3:
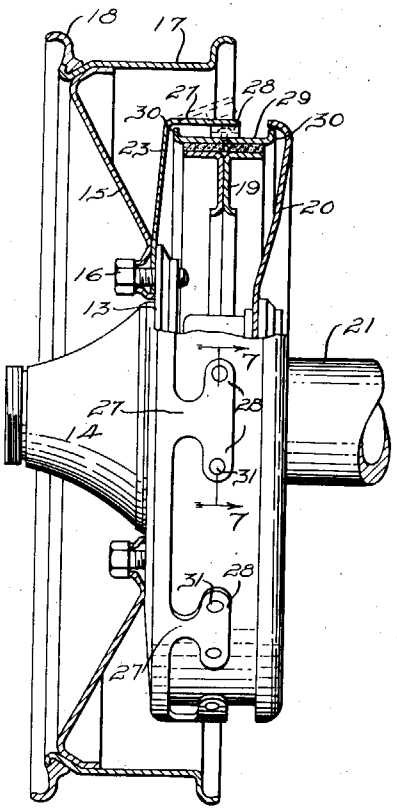
Fig. 3 is a view similar to Fig. 1 but illustrating another modification of my improved brake drum construction in connection therewith.
Figure 7:
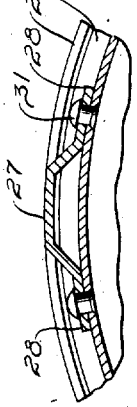
Fig. 7 is a fragmentary sectional view taken on the line 7—7 of Fig. 3.

In Fig. 3, a modified form of my invention is shown which is applicable to smaller installations. In this construction, the supporting portion 23 is provided with a plurality of fingers 27 arranged similar to the fingers 24 previously described, but in this case each of the fingers 27 is provided with laterally extending arms 28 which are offset radially inwardly from the main portion of the arms 27 a slight amount as indicated in Fig. 7. The brake drum 29, in this case for the sake of economy, is formed of sheet metal as indicated in Fig. 3, to provide a cylindrical portion and a pair of radially extending peripheral marginal flanges 30. The lateral portions 28 of the arms 27 are bent into contact with the cylindrical portion of the brake drum 29 midway between the flanges 30, as indicated in Figs. 3 and 7, and are then secured to such portion by rivets such as 31 or other suitable means. In assembling the portions 23 and brake drum 29 together, the arms 27 may be first bent out of their normal position, as indicated in dotted lines in Fig. 3, the brake drum 29 inserted between them and the fingers 27 then bent into normal position and the lateral flanges 28 secured to the brake drum, as described.

Figure 4:
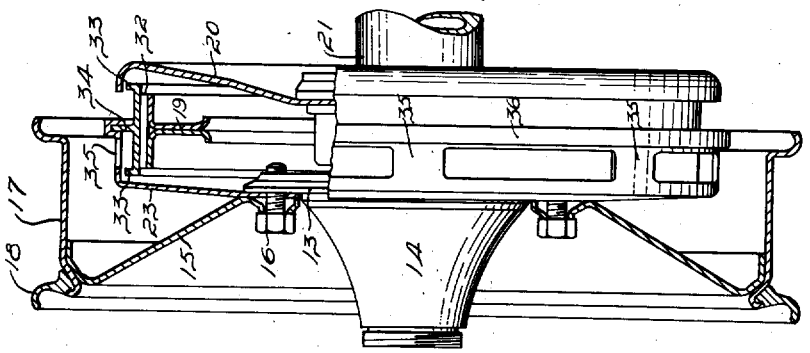
Fig. 4 is another view similar to Fig. 1 showing a further modification of my present invention in connection therewith.

In Fig. 4, another modification is shown in which a brake drum 32 is of a section providing relatively short marginal flanges 33 and an extended central radially extending rib 34. The supporting disc 23, in this case, is provided with a plurality of laterally extending fingers 35 which support a U-section ring portion 36 integrally formed therewith and within the U of which the outer edge of the rib 34 is received and suitably secured against movement. The effect of this construction is substantially the same as those previously described except that perhaps the brake drum 32 may be less affected by any resistance set up by the bending of the fingers 35 during expansion of the drum 32.

Figure 5:
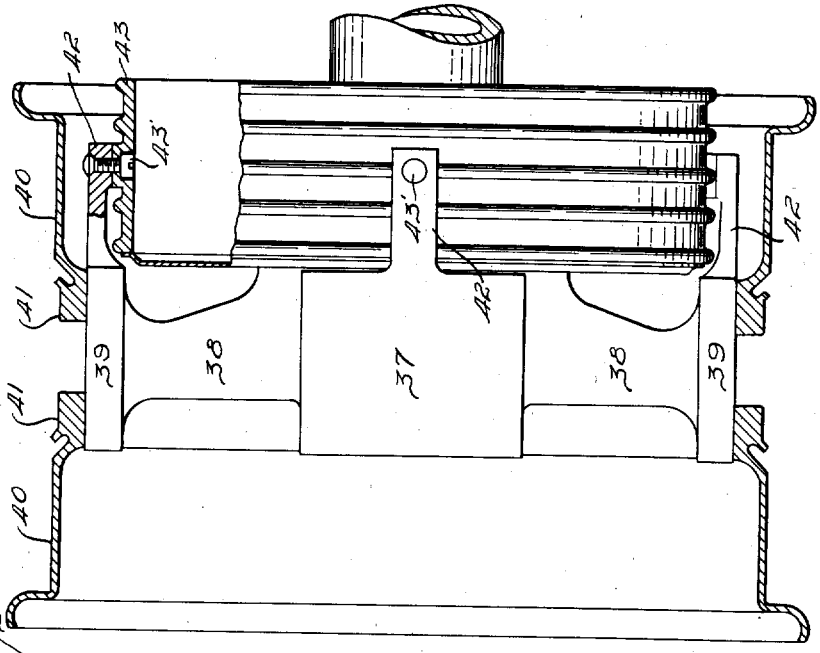
Fig. 5 is a partially broken side view of a wheel for heavy vehicles, such as trucks and the like, in connection with which a still modified form of my present invention is shown, the rims for the wheel being shown in section.

In Fig. 5, a modification of the present invention is shown applied to a wheel such as may be employed on trucks and like heavy vehicles. The particular construction of the wheel and rims are those shown and described in my Letters Patent of the United States dated Jan. 28, 1930, and numbered 1,744,915, and comprises essentially a wheel having a hub 37, and four radially extending integral spokes 38 each terminating in a separate rim supporting seat 39. The rims 40 are provided with enlarged laterally offset attaching and supporting portions 41 which are adapted to be secured to the various seats 39 by radially extending bolts (not shown).

In the particular embodiment shown in Fig. 5, each of the four seats 39 are provided with a laterally extending arm or finger 42 which serve the same purpose as the fingers 24, 27 and 35, previously described. The brake drum 43 may be formed of cast or hot rolled section and secured to the various fingers 42 by means of screws 43′ or other suitable means. This provides an extremely cheap and efficient construction for such type of wheels.

It will be apparent that under almost any conceivable range of expansion or contraction of the drums 22, 29, 32 and 43 from the causes described there will be insufficient movement of the drum to bend the respective supporting arms 24, 27, 35 and 42 an amount sufficient to set up stresses within the arms which will exceed the elastic limit of the metal from which they are formed, when such metal is of the type usually found in such constructions. It will be further apparent that should any danger of a permanent set in the arms arise because of possible excessive bending from such expansion of the drum, the arms may be formed of spring material having a high elastic limit to obviate such possibility, and be secured to their respective supporting portions in any suitable manner.

From the above it will be apparent that the present invention discloses a brake drum construction in which the deformation prevalent in the conventional forms of brake drums is eliminated, and that a construction is provided in which the brake shoe or brake band engaging portion of the drum may be formed of any desired material and at a cost that will compare very favorably with the cost of conventional constructions.

An additional advantage inherent in my device is that oil and water and dirt are automatically ejected and the braking surface is thereby kept clean. The reason for this is that the braking surface is mounted at some distance from the cage and this supporting cage is perforated, centrifugal force therefore causing any oil and water to be thrown through the perforations away from the braking surface.

Formal changes may be made in the specific embodiment of the invention described without departing from the spirit or substance of the broad invention, the scope of which is commensurate with the appended claims.

What I claim is:

1. In combination, a brake drum construction comprising a ring open on both sides and supported by radially yieldable lateral fingers secured to said ring independently of the edges thereof.

2. In combination, a brake drum construction comprising a ring having a cylindrical surface and of substantially equal strength on either side of a plane passing through its center perpendicular to its axis, and means for supporting said ring comprising radially yieldable members secured to said ring independently of the edges thereof.

3. In combination, a brake drum construction comprising a ring having a cylindrical surface and of substantially equal strength on either side of a plane passing through its center perpendicular to its axis, and means for supporting said ring comprising radially yieldable members, secured thereto centrally of the side edges thereof.

4. In combination, a brake drum comprising a ring provided with marginal stiffening flanges supported by laterally extending yieldable supporting means.

5. In combination, a brake drum comprising an open ended ring provided with radial marginal flanges extending therefrom in the same direction from both edges, and yieldable means supporting said ring from points between said flanges.

6. In combination, a brake drum construction comprising a ring having one face in the form of an uninterrupted cylinder and the opposite face provided with at least one radially extending rib between the edges thereof, and radially yieldable means secured to said rib for supporting said ring.

7. In combination, a brake drum construction comprising a disc-like member provided adjacent its periphery with laterally extending fingers, and a ring supported by said fingers in a plane substantially parallel with the plane of said disc.

8. In combination, a brake drum construction comprising a disc-like member provided adjacent its periphery with laterally extending fingers, means connecting the outer ends of said fingers, and a ring supported by said means.

9. In combination, a brake drum construction comprising a disc-like member provided with laterally extended fingers, the outer ends of said fingers being connected together, and a ring carried by said fingers in a plane parallel to said disc-like member.

10. In combination, a brake drum construction comprising a generally circular member, an open ended ring positioned in concentric relation thereto, and fingers integrally formed on said member connecting said member and said ring.

11. In combination, a brake drum construction comprising a generally circular member, an open ended ring positioned in concentric relation thereto, fingers fixed to said member and projecting therefrom towards said ring, the outer ends of said fingers being joined together, and said ring being supported independently of its edges through said fingers.

12. A composite brake device comprising a stamped steel drum having a relatively low carbon content including an annular portion and a web portion, said steel drum having perforations between the web and annular portions, a separate cylindrical portion constituting the breaking surface supported independently of its edges on said annular portion of the stamped steel drum.

13. A composite brake device comprising a stamped steel drum having a relatively low carbon content including an annular portion and a web portion, said steel drum having perforations between the web and annular portions, and a separate cylindrical portion constituting the brake surface having a central circular rib on the side opposite to said braking surface, said rib being connected to the annular portion of the stamped steel drum.

14. A perforated stamped metal drum including a web and an annular portion, and a separate imperforate cylindrical portion containing the braking surface connected to the annular portion of the stamped steel drum.

15. A perforated stamped metal drum including a web portion and an annulus, and an open ended cylidrical portion separated therefrom and connected to the annulus intermediate the edges of said cylindrical portion.

16. A perforated stamped metal member including a web and an annulus, and an open ended circular ring having a circular rib intermediate its ends, said circular rib being connected to said annulus.

17. A stamped metal drum including an annulus and a web, an open ended cylindrical portion formed separately therefrom and connected to the annulus intermediate the edges of said cylindrical portion.

18. A stamped metal drum including an annulus and a web, an open ended circular drum having a circular rib intermediate its edges, said circular rib being connected to said annulus.

19. The combination with an open ended drum for an internal brake mechanism, of means annularly interlocked with and supporting said drum, said connecting and supporting means permitting contraction or expansion of the drum without substantial distortion thereof.

20. In a brake structure a brake drum having an interior braking surface for an internal brake, and supporting means therefor yieldably supporting said drum.

21. In a brake, an open ended brake drum for an internal brake, and supporting means therefor for externally supporting said drum and having a yieldable connection therewith.

22. In an internal brake structure, the combination with a brake drum, means for externally supporting said drum, said means including a yieldable connection with the drum to permit expansion thereof without substantial distortion.

23. A composite brake device comprising a stamped metal drum and a ring providing a braking surface fixed thereto, said drum being provided with ventilating openings in the periphery thereof.

24. A braking device adapted to be secured directly to the hub of a wheel, comprising, in combination, an annulus provided with a cylindrical braking surface concentric with said wheel, and means for supporting said annulus independently of its edges, adapted for direct securement to said hub.

25. A braking device adapted to be secured to the hub of a wheel comprising, in combination, an annulus provided with a braking surface concentric with said hub and wheel, and a drumlike member supporting said annulus within its circumference by engagement therewith independently of the edges thereof, said member adapted to be secured directly to said hub.

26. A braking device adapted to be secured directly to the hub of a wheel, comprising, in combination, an annulus provided with a braking surface concentric with said wheel, a member independent of said wheel adapted for direct securement to the hub thereof, and fingers on said member engaging said annulus independently of its edges, thereby to support it relative thereto.

27. A braking device adapted to be secured directly to the hub of a wheel, comprising, in combination, an annulus provided with a braking surface, and means for supporting said annulus directly from said hub comprising a drum-like member secured to said annulus between the edges thereof and having open perforations in its circumference independently of said braking surface.

28. A brake device comprising a drum and a ring, said drum comprising an annulus and a web secured to one end thereof, said ring having an interior braking surface and being received within said annulus and secured thereto between its edges, and ventilation openings in said drum spaced from said braking surface.

29. In combination, a perforated stamped metal drum including a web portion and an annulus, and an open ended ring provided with a cylindrical braking surface and an annular rib intermediate its edges, said annular rib being connected to said annulus, and the ends of said ring being radially spaced from said annulus.

30. In a brake device, in combination, a ring having a cylindrical braking surface and a radially extending annular rib on the face opposite thereto, and a support for said ring comprising a sheet metal member extending to one side of said ring and having a portion thereof embracing opposite sides of said rib.

31. In a brake device, in combination, a ring having a cylindrical inner braking surface, a circumferentially extending rib disposed between the edges of said ring on the outer face thereof, and a drum comprising a web and an annulus closing one side of said ring, said annulus embracing both sides of said rib.

32. A brake device comprising, in combination, an inner shell of rolled steel T-section having a broad top and a short centrally disposed rib, and an outer shell disposed in concentric relation with respect to said inner shell and embracing both sides of said rib.

33. A brake device comprising, in combination, an inner shell of relatively high carbon rolled steel having a broad top and a short central rib, and a stamped low carbon outer shell surrounding said inner shell and tightly embracing said central rib.

34. A brake device comprising, in combination, an inner ring of high wear resisting material providing an inner braking surface, a radially outwardly extending circumferential rib on the outer face of sad ring disposed between the edges thereof, and a cup shaped pressed metal member enclosing one side of said ring and embracing opposite sides of said rib.

35. A brake device comprising, in combination, a stamped metal drum including a web and an annulus, said annulus having an annular inwardly opening channel therein, and a ring having an inner cylindrical braking surface and an outer annular rib disposed within said drum with said rib received in said channel.

36. A brake drum structure including an annular braking ring having an interior braking surface and a radially yieldable supporting annulus for said ring annularly interlocked therewith.

37. A brake drum structure including an annular braking ring having an interior braking surface and a radially yieldable disc structure supporting said ring serving as a head for said drum structure and annularly interlocked therewith.

38. A brake drum structure including an annular braking ring having an interior braking surface and means for exteriorly yieldably supporting said ring annularly interlocked therewith.

39. A braking device adapted to be secured directly to the hub of a wheel comprising, in combination, an annulus provided with a cylindrical braking surface concentric with said wheel, and means adapted for direct securement to said hub engaging said annulus independently of the effective braking surface edges thereof and at least partially independently of the support for said wheel.

EMIL A. NELSON.